US010669010B2

(12) United States Patent
Tajan et al.

(10) Patent No.: US 10,669,010 B2
(45) Date of Patent: Jun. 2, 2020

(54) UNDUCTED-FAN AIRCRAFT ENGINE INCLUDING A PROPELLER COMPRISING VANES WITH ROOTS OUTSIDE THE NACELLE AND COVERED BY DETACHABLE COVERS

(71) Applicant: SAFRAN AIRCRAFT ENGINES, Paris (FR)

(72) Inventors: Sébastien Emile Philippe Tajan, Sucy en Brie (FR); Adrien Jacques Philippe Fabre, Montrouge (FR); Adrien Louis Nicolas Laurenceau, Melun (FR); Jonathan Evert Vlastuin, Paris (FR); Laurence Francine Vion, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 143 days.

(21) Appl. No.: 15/569,639

(22) PCT Filed: Apr. 25, 2016

(86) PCT No.: PCT/FR2016/050969
§ 371 (c)(1),
(2) Date: Oct. 26, 2017

(87) PCT Pub. No.: WO2016/174335
PCT Pub. Date: Nov. 3, 2016

(65) Prior Publication Data
US 2018/0127084 A1    May 10, 2018

(30) Foreign Application Priority Data
Apr. 27, 2015  (FR) ..................................... 15 53766

(51) Int. Cl.
*B64C 11/06*       (2006.01)
*F01D 5/02*        (2006.01)
(Continued)

(52) U.S. Cl.
CPC .............. *B64C 11/06* (2013.01); *B64D 27/10* (2013.01); *F01D 5/021* (2013.01); *F01D 7/00* (2013.01);
(Continued)

(58) Field of Classification Search
CPC ....... F01D 5/021; F05D 2250/90; B64C 11/06
See application file for complete search history.

(56) References Cited

U.S. PATENT DOCUMENTS 5,035,576 A    7/1991 Byrnes
8,801,384 B2   8/2014 Fabre et al.
9,790,794 B2 * 10/2017 Chartier .................. B64C 11/06

FOREIGN PATENT DOCUMENTS

CA    2010153 A1   10/1990
EP    0166573 A1    1/1986
(Continued)

OTHER PUBLICATIONS

International Search Report for PCT/FR2016/050969 dated Jul. 6, 2016.
French Search Report for FR 1553766 dated Feb. 17, 2016.

*Primary Examiner* — Igor Kershteyn
*Assistant Examiner* — Jason G Davis
(74) *Attorney, Agent, or Firm* — Pearne & Gordon LLP

(57) ABSTRACT

The invention relates to an unducted-fan aircraft engine comprising a generally cylindrical nacelle through which a primary jet flows, the nacelle bearing a fan rotor comprising variable-pitch vanes (33) located radially outside the nacelle in order to be traversed by a secondary jet (31) flowing longitudinally around the nacelle. The rotor comprises a hub bearing variable-pitch vane supports each carrying one vane (33), each vane (33) comprising a blade extending from a root that is used to removably attach same to a base of the associated support (34). Each base (36) is located radially outside the nacelle so that it is in the secondary jet, and each (Continued)

assembly formed by a base (36) and the vane root supported by the base (36) is surrounded and covered by a detachable aerodynamic cover (37).

7 Claims, 4 Drawing Sheets

(51) Int. Cl.
    *F01D 7/00*     (2006.01)
    *B64D 27/10*     (2006.01)
    *B64D 27/00*     (2006.01)

(52) U.S. Cl.
    CPC ......... *B64D 2027/005* (2013.01); *Y02T 50/66* (2013.01)

(56) References Cited

FOREIGN PATENT DOCUMENTS

| | | |
|---|---|---|
| FR | 1212325 A1 | 3/1960 |
| FR | 2641251 A1 | 7/1990 |
| FR | 2645499 A1 | 7/1990 |
| FR | 2957051 A1 | 9/2011 |
| FR | 3005683 A1 | 11/2014 |
| GB | 2180099 A | 3/1987 |
| GB | 2229230 A | 9/1990 |

\* cited by examiner

UNDUCTED-FAN AIRCRAFT ENGINE INCLUDING A PROPELLER COMPRISING VANES WITH ROOTS OUTSIDE THE NACELLE AND COVERED BY DETACHABLE COVERS

TECHNICAL FIELD

The invention relates to an unducted-fan type aircraft engine, also called an open rotor, i.e. comprising an external fan.

PRIOR ART

An unducted-fan engine 1 such as that in FIG. 1, comprises a generally cylindrical nacelle 2, the front portion of which defines an air intake sleeve and the rear portion of which bears two contra-rotating propellers 3 and 4. These two propellers constitute an external propulsion fan, the blades of said propellers 3 and 4 being located radially outside the nacelle 2.

The sleeve that defines the nacelle 2 is traversed by a first air flow 6, also called a primary jet, which is firstly compressed in a compressor 7 before being burnt in a combustion chamber 8. This flow is then expanded in a turbine 9 in order to drive a main shaft of the engine which extends along a longitudinal axis AX of the engine.

This main shaft drives the contra-rotating rotors or propellers 3 and 4 in rotation via an intermediate mechanism, the blades of said rotors being traversed by a second air flow, also called a secondary jet. Said secondary jet surrounds the nacelle and is propelled by the contra-rotating propellers in order to produce the thrust generated by the engine.

Each rotor 3, 4 comprises a support hub 12, borne by the nacelle 2 while being driven by the central shaft, said hub 12 having a cylindrical ducted outer face extending in the extension of the fixed outer ducting shroud of the nacelle 2, said hub 12 bearing the vanes 13 of the rotor that it constitutes.

The vanes of such a propeller 3, 4 are of the variable-pitch type, i.e. the angular position of each vane 13 about the radial axis thereof can be adjusted during operation of the engine 1, in order to optimise this orientation relative to the operating conditions under all circumstances.

The hub 12 more particularly comprises a main spool bearing a series of vane supports 14 evenly spaced apart from each other, each support 14 carrying a vane 13.

In more concrete terms, each vane 13 comprises a blade and a root through which it is rigidly secured to a corresponding base of the support 14 that carries same. The orientation of the supports 14 about their respective radial axes can be adjusted by an internal mechanism of the hub 12, which is used to adjust the pitch of the vanes where necessary.

The rotor further comprises an external collar constituted from different elements or covers brought to the outer peripheral face of the hub spool, said collar being traversed by the blades of the vanes, the rotary vane supports being installed in the hub spool.

Each vane is attached to the support that carries it in a detachable manner. Therefore, in the event of deterioration of a vane, the vane can be replaced by removing the collar to access the support carrying said vane in order to detach the vane root from the base of this support, before assembling the new vane.

The purpose of the invention is to define a new architecture for unducted-fan engines in order to simplify the attachment of vanes and the cooling thereof.

DESCRIPTION OF THE INVENTION

The invention relates to an unducted-fan aircraft engine comprising a generally cylindrical nacelle through which a primary jet flows, said nacelle bearing a fan rotor comprising variable-pitch vanes located radially outside the nacelle in order to be traversed by a secondary jet flowing longitudinally around said nacelle, said rotor comprising a hub bearing variable-pitch vane supports each carrying one vane, each vane comprising a blade extending from a root that is used to removably attach same to a base of the support bearing same, characterised in that each base is located radially outside the nacelle so that it is in the secondary jet, and in that each assembly formed by a base and the vane root supported by said base is surrounded and covered by a detachable aerodynamic cover.

In general, the invention is used to simplify the replacement of a vane, while significantly improving the aerodynamics of the vanes and the fan rotor. It also provides improved cooling of the vane supports, which contributes to simplifying the cooling means that are conventionally required for this region.

The invention further relates to an engine thus defined, wherein the aerodynamic cover comprises an upstream half-cover and a downstream half-cover that respectively surround an upstream portion and a downstream portion of the assembly formed by the base and the vane root borne by said base.

The invention further relates to an engine thus defined, wherein the aerodynamic cover is movable while being rigidly secured to the assembly constituted by the vane root and the base of the support bearing the vane.

The invention further relates to an engine thus defined, wherein the aerodynamic cover is stationary while being secured to a collar of the hub in order to be stationary relative to this hub.

The invention further relates to an engine thus defined, wherein the aerodynamic cover comprises an air intake opening in the secondary jet in order to cool the vane support and an opening for discharging said cooling air.

The invention further relates to an engine thus defined, wherein the openings in the aerodynamic cover are plugged by the vane when said vane is in a reference position.

The invention further relates to an engine thus defined, wherein the aerodynamic cover comprises a protuberance in the form of a flap located downstream of the vane and extending in the extension of the trailing edge of said vane.

The invention further relates to an unducted fan of an aircraft engine comprising a fan rotor thus defined.

The invention further relates to an aircraft engine comprising a fan thus defined.

DETAILED DESCRIPTION OF THE SPECIFIC EMBODIMENTS

Figure 1:
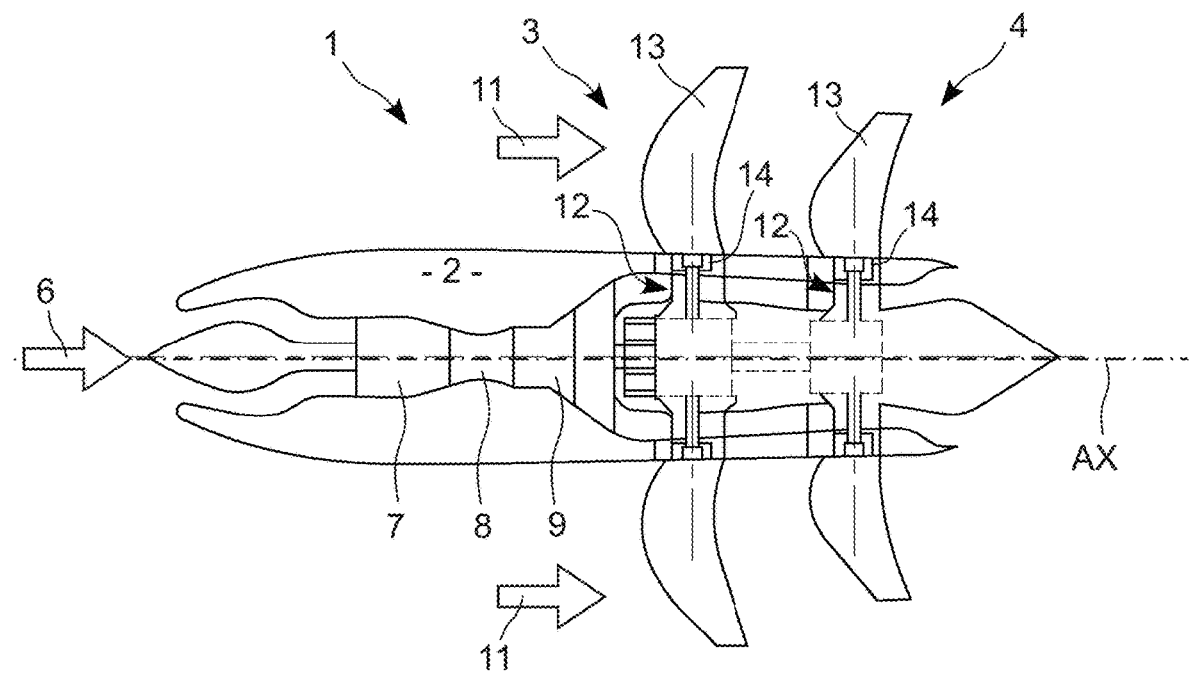
FIG. 1 shows a sectional side view of an unducted-fan engine according to the prior art.
Figure 2:
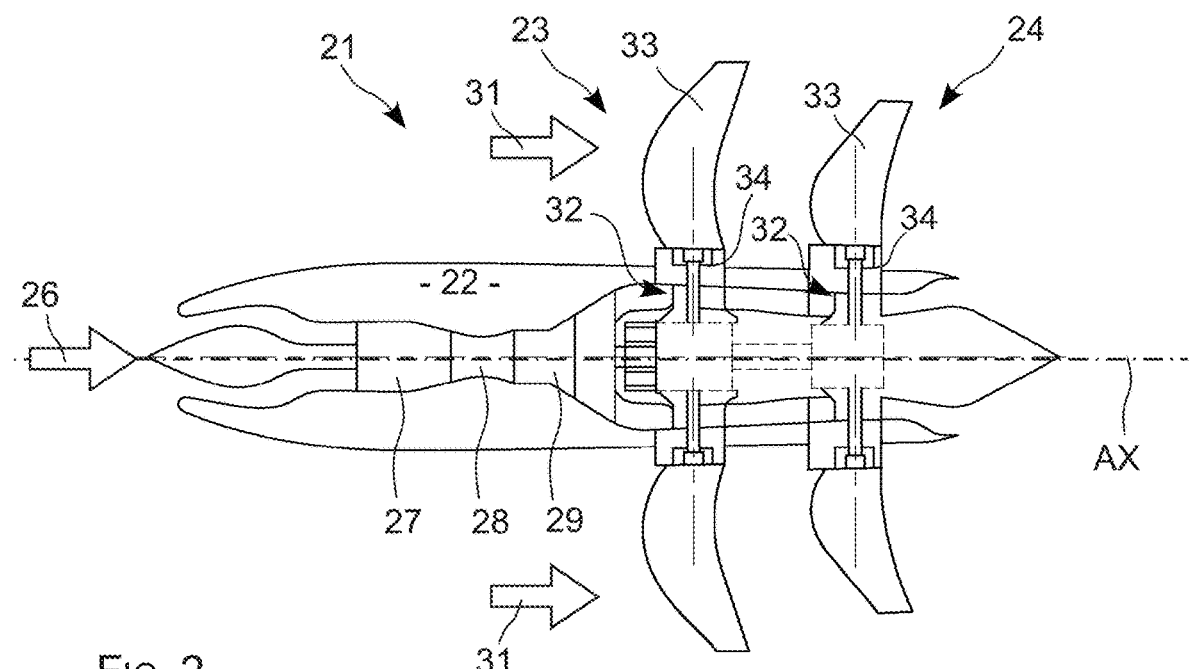
FIG. 2 shows a sectional side view of an unducted-fan engine according to the invention.

The unducted-fan engine 21 according to the invention that appears in FIG. 2 has a general structure similar to that of the engine of the prior art in FIG. 1. It also comprises a nacelle 22 defining an air intake sleeve and bearing two contra-rotating rotors or propellers 23 and 24, the vanes of which are located outside the nacelle 2.

The sleeve defined by the nacelle 22 is traversed by a primary air jet 26 that enters a compressor 27 then a combustion chamber 28 and a turbine 29 to drive a main shaft extending along a longitudinal axis AX. This shaft drives the rotors 23 and 24 via an intermediate mechanism, the blades of said rotors being traversed by a secondary jet 31 in order to generate the thrust of the engine.

Each rotor 23, 24 in this case also comprises a hub 32, borne by the nacelle 22 and driven by the shaft, said hub 32 having an outer face ducted by a cylindrical collar extending in the extension of the stationary outer ducting shroud of the nacelle 22, each hub 32 bearing the vanes 13 of the propeller or rotor that it constitutes. The vanes of the rotors 23, 24 are also variable-pitch vanes, in order to be able to adjust the orientation thereof to an optimum value under all operating conditions.

Each hub 32 comprises a main spool bearing a series of vane supports 34 evenly spaced apart from each other and each carrying a vane 33. Each vane 33 is also rigidly secured to the support 34 that carries same, the orientation of the supports 34 about their respective radial axes being modular thanks to a mechanism located in the hub 12, in order to modify the pitch of the vanes during operation.

Unlike for the known engine in FIG. 1, the supports 34 that bear the vanes 33 are in this case radially offset in order to be partially located outside the nacelle 22 and the hub 32 that bears same. More particularly, each support 34 comprises, in the portion thereof located the furthest away from the rotational axis AX when in place, a base 36 that receives the root of the vane 33 that it bears, said base being located in the secondary jet, i.e. radially outside the nacelle.

In practice, the hub comprises, at the outer face thereof, a cylindrical collar which ducts same, and which is traversed by each vane support, the bases of said supports being located at the outer face of the collar, from which they protrude, the outer diameter of the hub at the level of the collar corresponding to the outer diameter of the nacelle.

Each assembly formed by a vane root and the base in which it is engaged is covered by a cover 37 surrounding said assembly in order to constitute a wind deflector, having an outer circumference that extends as far as the outer face of the collar, in order to reduce the air drag of the attachment region.

The attachment of the vane 33 to the support 34 is a broaching attachment attaching the root of the vane in the base 36, i.e. an attachment through which the base 36 comprises a slide oriented along an axis that is normal to the radial axis, the vane root having a complementary shape, engaging in said slide. Such a broaching attachment system with a restraint system implementing abutments is disclosed in the patent document FR3005683. In this case, the base is located outside the collar 42, so as to allow the vane to be removed without requiring removal of said collar.

Figure 3:
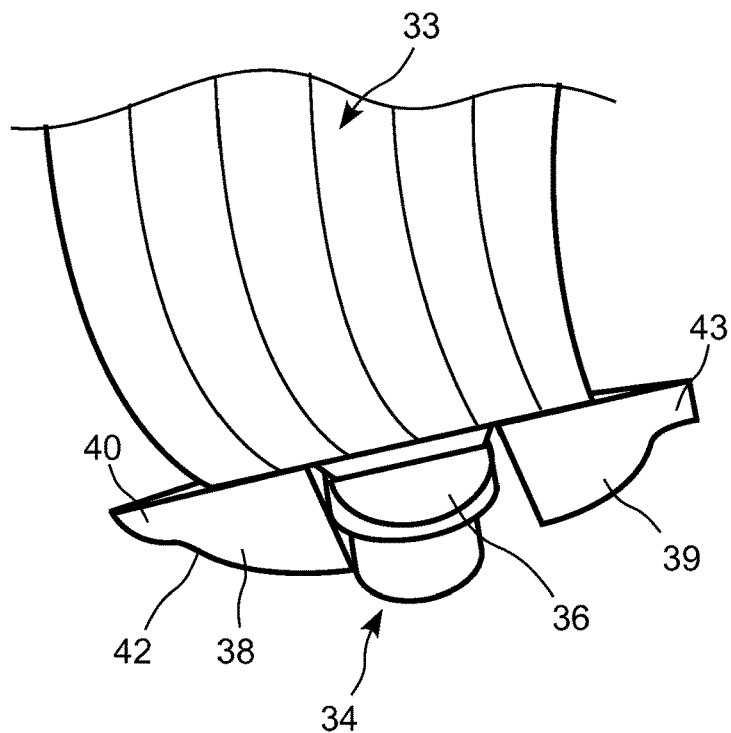
FIG. 3 shows a partial perspective view of a vane, the root thereof being rigidly connected to a rotary support base with two half-covers intended to be attached to the base and the root in order to form a cover covering same according to the invention.
Figure 4:
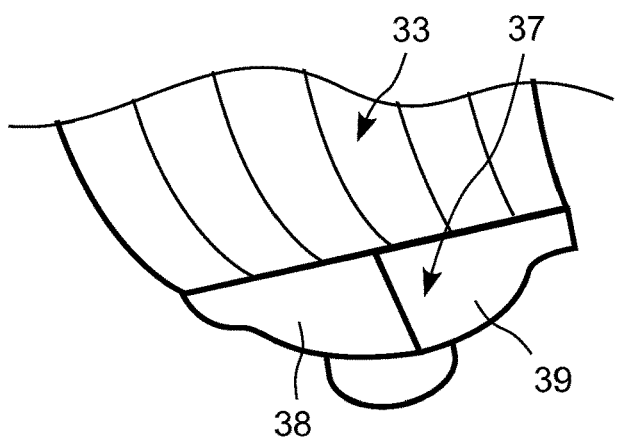
FIG. 4 shows a partial perspective view of a vane, the root thereof being rigidly connected to a rotary support base with a cover attached to the base and the root in order to cover same according to the invention.
Figure 5:
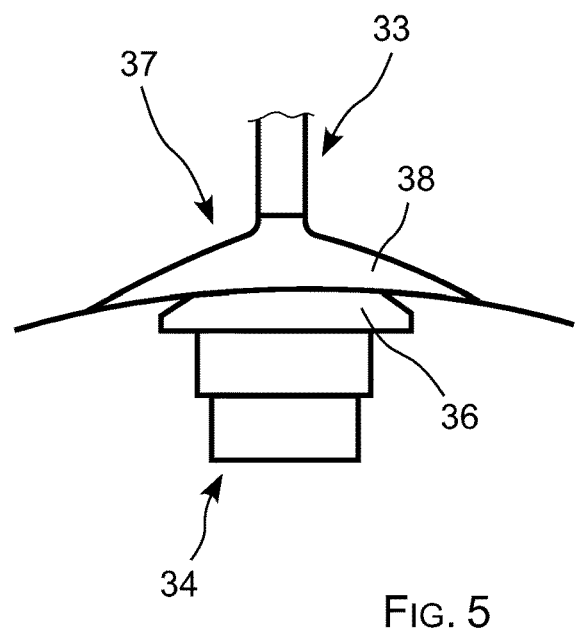
FIG. 5 shows a partial front view of a vane, the root thereof being rigidly connected to a rotary support base with a cover attached to the base and the vane root in order to cover same according to the invention.

The cover 37 that appears more clearly in FIGS. 3 to 5 comprises an upstream portion 38 and a downstream portion 39, complementary in shape, that surround the vane root and the base 36 in which said root is held, while covering same.

As shown in FIGS. 3 to 5, the upstream portion 38 and the downstream portion 39 that are substantially symmetrical to each other are each present in the form of a skew surface. They both have, from an overhead view, a shape similar to that of a half-disc comprising a protuberance in the shape of a mouth on the side opposite the rectilinear edge of said half-disc.

When said two portions are joined, i.e. when they are fully mounted as shown in FIGS. 4 and 5, they define, from an overhead view, a shape similar to that of a disc having two protuberances in the shape of mouths that are diametrically opposed.

The first half-portion 38 has a general half-disc shape that is initially planar, folded to around 150° about the right bisector of the rectilinear side thereof, and comprising a notch travelling from the central region thereof and extending on either side of the right bisector of the rectilinear side to open out into said rectilinear side. The mouth-shaped protuberance, which bears the reference numeral 40, thus extends in the protrusion of the right bisector of the rectilinear side, i.e. it is diametrically opposite the opening of the notch in the rectilinear edge.

When the first portion 38 is in place, as shown in FIGS. 3 and 4, the notch surrounds the upstream half of the base of the vane 33, the semi-circular outline 41 with the mouth 40 is substantially bearing against the collar 42. The rectilinear edge of the first portion is therefore separated into two halves, located on either side of the vane in order to constitute two segments that are inclined relative to each other by about 150°, one of said segments being shown in FIG. 3.

The second half-portion, bearing the reference numeral 39, has a shape that is generally symmetrical to that of the first portion 38 relative to a plane that is normal to the right bisector of the rectilinear side. When said second portion is in place, the notch thereof surrounds the downstream half of the base of the vane 33, the semi-circular outline thereof provided with another mouth, bearing the reference numeral 43, is substantially bearing against the collar 42, and the rectilinear edge thereof is separated into two portions or segments bearing against the corresponding segments of the first portion 38.

In this example, the cover is constituted from two half-portions corresponding to one front half-portion and one rear half-portion, however said two half-portions could also be lateral with one left half-portion and one right half-portion jointly constituting the cover.

In the example in FIGS. 3 to 5, once the cover 37 is mounted, it is rigidly secured to the assembly that is formed by the base 36 and the root of the vane 33, while having a generally circular edge or circumference, with the two mouths 40, 43 thereof being held at rest against the outer face of the collar 42. Therefore, when the vane 33 rotates about itself in order to change the pitch thereof, the cover 37 also rotates with the vane 33 and the support 34 thereof, which form a whole.

Said cover therefore ducts the assembly constituting the base 36 and the vane root engaged in said base, so as to optimise the aerodynamic properties thereof, in particular by reducing drag.

Given that said cover 37 is located on the outer side of the collar 42, the removal thereof can take place directly under wing, i.e. without removing the engine, which in particular provides access to the base 36 and the vane root in order to change the vane in question without having to remove any additional engine element.

Figure 6:
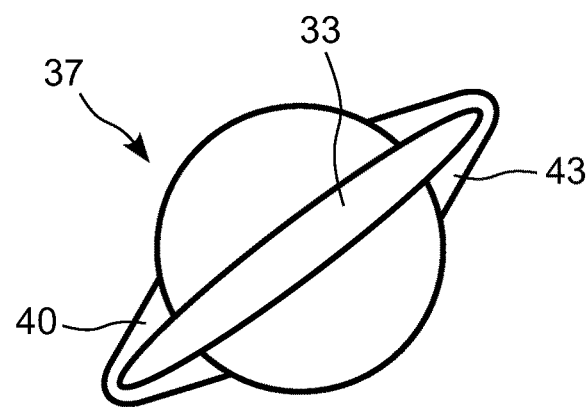
FIG. 6 is a diagrammatic overhead view of a vane that is inclined relative to the reference pitch thereof, and that is provided with a movable cover covering the root thereof in addition to the base, wherein said root is mounted such that it is attached to said root and to said base in order to be able to move with the vane according to the invention.

In the example in FIGS. 3 to 5, the cover 37 with the mouths 40 and 43 thereof is a movable cover rigidly secured to the vane root and to the base in order to form a whole with said elements, said whole being capable of moving in rotation about an axis that is radial with respect to the hub bearing same, as diagrammatically illustrated in FIG. 6.

However, the cover 37 can also be a stationary cover type by being rigidly secured to the outer face of the collar 42 in order to be stationary relative to the hub, so as to optimise the aerodynamics of the vane, mainly when it is in a reference position or at a reference pitch angle.

Figure 7:
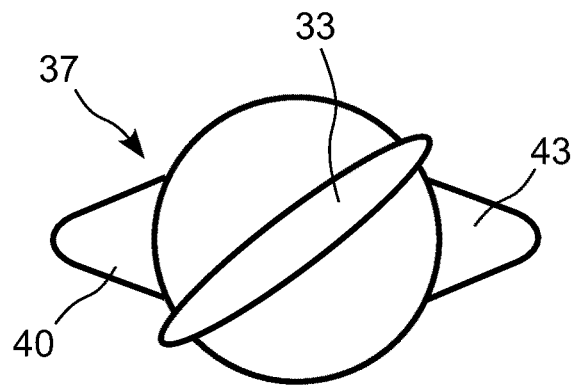
FIG. 7 is a diagrammatic overhead view of a vane that is inclined relative to the reference pitch thereof, and that is provided with a stationary cover covering the root thereof in addition to the base, wherein said root is mounted such that it is attached to the collar so that it is stationary relative to the vane according to the invention.
Figure 8:
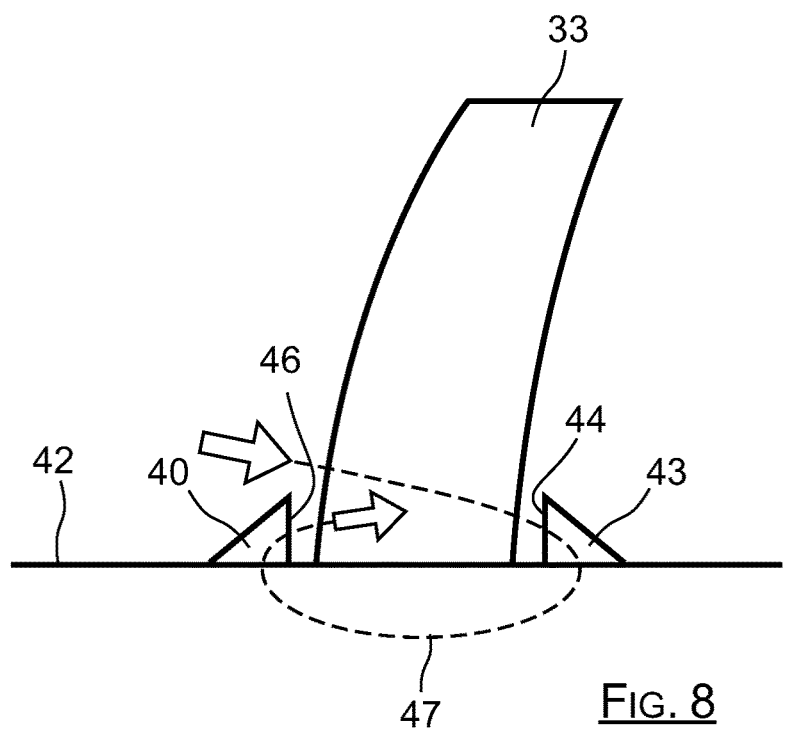
FIG. 8 is a diagrammatic side view of a vane provided with a stationary cover, the mouths of which constitute cooling scoops according to the invention.

In this case, which corresponds to FIGS. 7 and 8, the mouths 40 and 43 can be provided in order to constitute scoops creating an air flow inside the hub, about the vane support, in order to effectively cool said support when the vane is inclined relative to the reference pitch thereof, as shown in FIG. 7.

The downstream mouth 43 thus comprises an opening 44 located opposite the trailing edge of the vane when the latter is in the reference pitch position thereof. In a similar manner, the upstream mouth 40 also comprises an opening of the same type, bearing the reference numeral 46, located opposite the leading edge of the vane when said vane is in the reference pitch position thereof.

When the vane 33 is inclined relative to the reference pitch thereof, as shown more clearly in FIG. 7, the trailing edge and the leading edge of said vane 33 are respectively offset relative to the openings 44 and 46 in the mouths, in order to clear said openings to improve air flow.

This air flow, which is shown by means of a flow line bearing the reference numeral 47 in FIG. 8, firstly consists of an air intake through the front opening 44 of the downstream scoop formed by the mouth 43. The trajectory 47 of the air thus aspirated into the secondary jet 31 is then deviated in the upstream direction in order to lead said air into the hub 32 about the rotary base of the vane support 34 for the cooling thereof. Once said air has ventilated the base of the rotary support, it is expelled by the upstream mouth 40 through the opening 46 thereof, which is oriented in the downstream direction.

In operation, and as stated hereinabove, when the vane is in the reference pitch position thereof, which corresponds, for example, to the operating conditions of the engine at cruising speed, it is aligned with the scoops formed by the mouths 40, 43 in order to close the openings in said scoops.

This cruising speed situation typically corresponds to a case in which the cooling needs are low, whereby the air flow 47 is therefore substantially zero since the openings 44, 46 are closed.

In other situations, and in particular during take-off, the pitch of the vanes deviates from the reference pitch in order to modify the pitch of the propeller. As a result of this deviation, the leading edge and the trailing edge are offset relative to the openings 44 and 46 in order to improve the flow of cooling air along the flow line 47.

In general, the rotary vane supports and the actuation mechanisms for said supports that are located at the bases thereof require significant cooling in the transient states, in particular in the take-off phases. This cooling need disappears when the engine is operating at cruising speed, which corresponds to a situation in which the vanes are in the reference pitch positions thereof.

Figure 9:
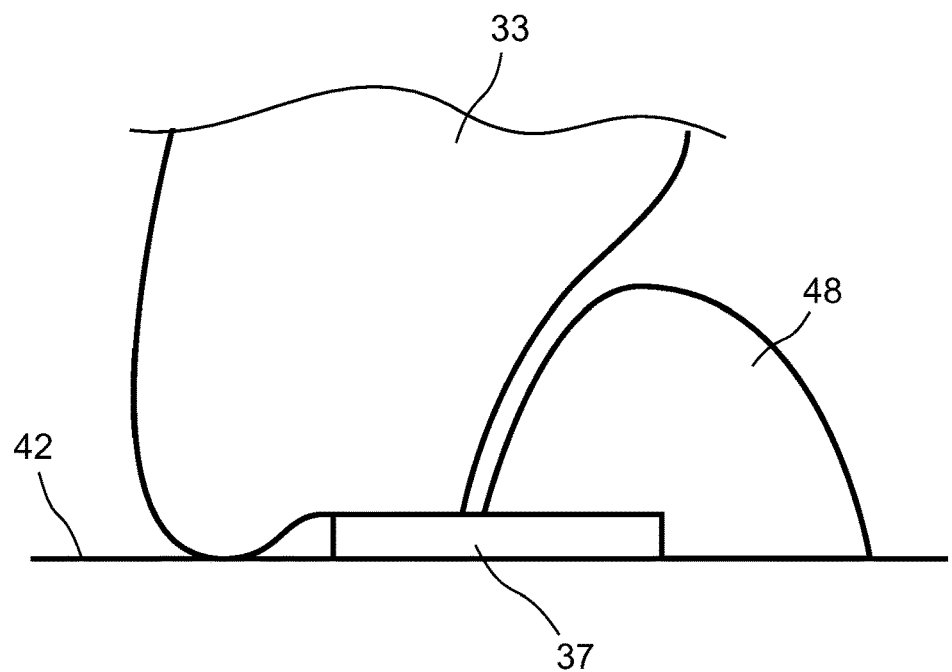
FIG. 9 is a diagrammatic side view of a vane provided with a stationary cover comprising a stationary flap in the extension of the trailing edge of the vane according to the invention.
Figure 10:
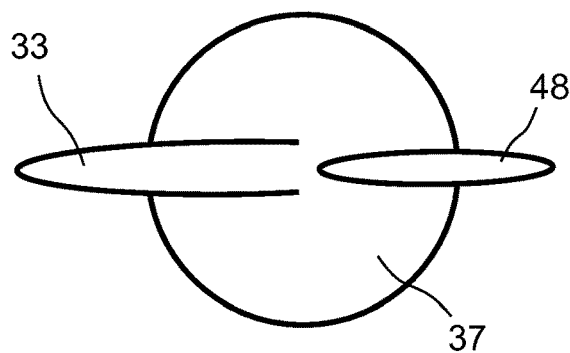
FIG. 10 is a diagrammatic overhead view of a vane provided with a stationary cover comprising a stationary flap in the extension of the trailing edge of the vane when the vane is oriented according to the reference pitch angle thereof according to the invention.

In the examples in FIGS. 2 to 8, each variable-pitch vane 33 is formed in one piece and is entirely supported by the vane support. However, according to the invention, the cover 37 can also be stationary relative to the collar and can further comprise, at the downstream portion thereof, a radial protuberance extending in the extension of the trailing edge of the vane, as diagrammatically illustrated in FIGS. 9 to 11.

In this case, the cover 37 is stationary relative to the collar 42 and comprises a protuberance 48 in the shape of a flap that extends in the radial direction, i.e. parallel to the vane 33 in place in order to extend the rear portion of said vane 33 at the lower portion of the blade thereof, i.e. at the portion the closest to the blade root.

Therefore, under nominal engine operation, i.e. at cruising speed, the pitch of the vane, i.e. the angular position thereof about the radial axis is at the nominal or reference value thereof. The stationary flap 48 therefore extends in the extension of the blade 33.

Figure 11:
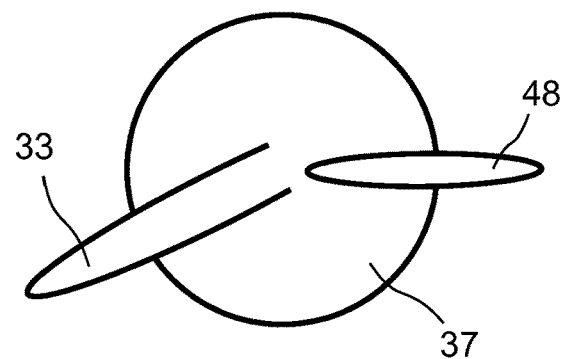
FIG. 11 is a diagrammatic overhead view of a vane provided with a stationary cover comprising a stationary flap in the extension of the trailing edge of the vane when the vane is inclined relative to the reference pitch angle thereof according to the invention.

During transient states, in particular such as aircraft take-off, the pitch angle of the vanes changes and takes a value corresponding to that shown in FIG. 11. In this case, the vane 33 forms an angle with the stationary flap 48 in order to define a hollow inner face in the region close to the vane root, said hollow shape providing improved aerodynamic performance for the state considered.

In general, thanks to the stationary rear flap 48, when the vane forms an angle relative to said flap, in particular during the take-off phase, the profile of the wings constituted by the blade and the flap are similar to a so-called lift augmentation configuration, which provides considerable benefits in terms of the maximum permissible tensile stress for the vane.

In general, the invention also significantly improves the aerodynamics of the vanes and fan rotor, while providing better cooling of the vane supports, which contributes to simplifying the cooling means conventionally required for this region.

The fact that the bases and vane roots are located outside the nacelle, i.e. in the secondary jet, also allows a vane to be replaced directly under wing, without requiring the removal of any other part of the engine.

What is claimed is:

1. Unducted-fan aircraft engine, said engine comprising a generally cylindrical nacelle through which a primary jet flows, said nacelle bearing a fan rotor comprising variable-pitch vanes located radially outside the nacelle in order to be traversed by a secondary jet flowing longitudinally around said nacelle, said rotor comprising a hub bearing variable-pitch vane supports each carrying one of said variable-pitch vanes, each of said variable-pitch vanes comprising a blade extending from a root that is used to removably attach said blade to a base of the support bearing said blade, wherein each of said bases is located radially outside the nacelle so that each of said bases is in the secondary jet, and in that each assembly, formed by one of said bases and the respective root supported by said one of said bases, is surrounded and covered by a detachable aerodynamic cover.

2. The engine according to claim 1, wherein at least one of the aerodynamic covers comprises an upstream half-cover and a downstream half-cover that respectively surround an upstream portion and a downstream portion of the respective assembly, formed by one of said bases and the respective root supported by said one of said bases.

3. The engine according to claim 1, wherein at least one of the aerodynamic covers is movable while being rigidly secured to the respective assembly, formed by one of said bases and the respective root supported by said one of said bases.

4. The engine according to claim 1, wherein at least one of the aerodynamic covers is stationary while being secured to a collar of the hub in order to be stationary relative to the hub.

5. The engine according to claim 4, wherein the at least one of the aerodynamic covers comprises an air intake opening in the secondary jet in order to cool the vane support and an opening for discharging said cooling air.

6. The engine according to claim 5, wherein the air intake opening and the opening for discharging said cooling air are plugged by the vane when said vane is in a reference position.

7. The engine according to claim 4, wherein the at least one of the aerodynamic covers comprises a protuberance in the form of a flap located downstream of the vane and extending in an extension of a trailing edge of said vane.

* * * * *